(12) United States Patent
Van Faassen

(10) Patent No.: US 7,878,321 B2
(45) Date of Patent: Feb. 1, 2011

(54) HELICAL CONVEYOR WITHOUT OVERDRIVE

(75) Inventor: Willem Van Faassen, Hengelo (NL)

(73) Assignee: Ashworth Bros., Inc., Fall River, MA (US)

( * ) Notice: Subject to any disclaimer, the term of this patent is extended or adjusted under 35 U.S.C. 154(b) by 403 days.

(21) Appl. No.: 11/884,096

(22) PCT Filed: Feb. 1, 2006

(86) PCT No.: PCT/EP2006/000993

§ 371 (c)(1),
(2), (4) Date: Sep. 17, 2008

(87) PCT Pub. No.: WO2006/084639

PCT Pub. Date: Aug. 17, 2006

(65) Prior Publication Data

US 2009/0038916 A1 Feb. 12, 2009

(30) Foreign Application Priority Data

Feb. 11, 2005 (EP) .................................. 05075342

(51) Int. Cl.
*B65G 13/02* (2006.01)
(52) U.S. Cl. .................................................. 198/778
(58) Field of Classification Search ................. 198/778
See application file for complete search history.

(56) References Cited

U.S. PATENT DOCUMENTS

| 3,348,659 | A | | 10/1967 | Roinestad |
| 3,938,651 | A | * | 2/1976 | Alfred et al. ................. 198/778 |
| 4,858,750 | A | * | 8/1989 | Cawley ....................... 198/778 |
| 4,901,844 | A | * | 2/1990 | Palmaer et al. ............... 198/778 |
| 5,350,056 | A | * | 9/1994 | Hager ......................... 198/778 |
| 6,619,069 | B1 | * | 9/2003 | Persson ....................... 62/381 |
| 7,347,316 | B2 | * | 3/2008 | Heber ......................... 198/778 |
| 2004/0011627 | A1 | | 1/2004 | Palmaer et al. |

FOREIGN PATENT DOCUMENTS

EP 0293095 A1 11/1988

* cited by examiner

*Primary Examiner*—Gene Crawford
*Assistant Examiner*—William R Harp
(74) *Attorney, Agent, or Firm*—Nixon Peabody LLP; Jeffrey L. Costellia

(57) ABSTRACT

The invention relates to a conveyor assembly, such as a stacker, comprising: a vertically arranged drum having a substantially smooth peripheral surface; a conveyor belt, at least one full turn wound along the peripheral surface of the drum, said belt comprising support elements to support portions of the belt on top of each other; wherein the bottom part of the drum widens outwardly and the remaining part of the drum is cylindrical.

6 Claims, 1 Drawing Sheet

HELICAL CONVEYOR WITHOUT OVERDRIVE

BACKGROUND OF THE INVENTION

The invention relates to a conveyor assembly, commonly known as stackers. With such stackers a drum is vertically arranged and a conveyor belt is wound around the drum. The conveyor belt is driven by this drum. With a so-called full stacker the conveyor belt is stacked and supports itself. One portion of the conveyor belt supports the stacked portions on top of this supporting portion. With half stackers one side of the conveyor belt adjacent to the drum supports the stacked portions above this supporting portion and the other side of the conveyor belt is supported by a stationary guide rail.

The first stacker systems used positive driving of the conveyor belt. The drum was provided with for example ribs, which engage with the sides of the conveyor belt providing a shape closed force transfer. Such a driving can result in very high forces in the conveyor belt resulting in early breakage of the conveyor belt.

Another principle for driving the conveyor belt with a drum is the overdrive principle. In such a case a certain slip is maintained between the drum and the conveyor belt. If the forces in the conveyor belt tends to rise, the slip increases, limiting the tension and forces in the conveyor belt. In order to achieve such a slip a drum with a smooth peripheral surface is provided. The drum is driven and mainly drives the conveyor belt. In order to avoid a positive driving of the conveyor belt a second driving means is provided to drive the conveyor belt at a different speed such that slip will occur and be maintained between the drum and the conveyor belt. Especially when starting up such a conveyor assembly it is difficult to control the motor of the drum and the motor of the conveyor belt, such that a slip will occur and be maintained by the driving means.

U.S. Pat. No. 3,348,659 describes a conveyor assembly having a drum around which a conveyor belt is wound. This document does not disclose a stacker belt, but a conveyor belt which is fully supported by guide rails. In order to achieve the necessary slip between the drum and the conveyor belt the document teaches to use a non-cylindrical drum. The drum must decrease in diameter in the transport direction of the conveyor belt. At each turn the diameter of the conveyor belt and the drum decreases such that there is always a speed difference maintained between the peripheral velocity of the drum and the conveyor belt.

SUMMARY OF THE INVENTION

It is an object of the invention to provide a conveyor assembly of the stacker type being less complicated in construction as the conveyor assemblies according to the prior art.

This object of the invention is achieved by a conveyor assembly comprising:
- a vertically arranged drum having a substantially smooth peripheral surface;
- a conveyor belt, at least one full turn wound along the peripheral surface of the drum, said belt comprising support elements to support portions of the belt on top of each other;
- wherein the bottom part of the drum widens outwardly and the remaining part of the drum is cylindrical.

Quite unexpectedly it was shown that the tension and forces in the conveyor belt were maintained low although the conveyor belt was solely driven by the drum and no slip was available or introduced as with conveyor assemblies according to the prior art. A widened portion of the drum is provided such that the conveyor belt maintained its relative position with respect to the drum. Due to the widened portion at the bottom of the drum, the conveyor belt rests on the drum and the weight of the conveyor belt ensures that the drum is maintained at its original position. Due to the difference in diameter of the widened portion a smooth introduction of the conveyor belt into the stack of the conveyor belt is achieved. Upon introduction of the conveyor belt the peripheral velocity of the widened portion is larger than the velocity of the conveyor belt. As the conveyor belt is wound around the drum the conveyor belt is advanced upwardly to the cylindrical portion where the peripheral velocity of the cylindrical drum portion is substantially identical to the velocity of the conveyor belt. At this portion the conveyor belt will grip to the drum and the conveyor belt is driven by the drum with no significant slip.

A smooth surface is defined as a surface having no protrusions or other wise, which can positively couple with the conveyor belt providing a shape defined force transfer. The smooth surface should provide the ability for the belt to slide along the surface if necessary, for example in the case the conveyor belt is blocked. The surface can however have openings, as long as the openings do not interfere with the ability for the belt to slide along the surface.

The support elements could either support portions of the belt partially, such as in a half stacker, or fully such as in a full stacker.

In an embodiment of the conveyor assembly according to the invention the assembly comprises driving means for driving the assembly, wherein the conveyor belt is directly driven by the drum. In a very preferred embodiment the peripheral velocity of at least the cylindrical portion of the drum is substantially equal to the velocity of the belt.

An additional advantage of the conveyor assembly according to the invention is that no substantial black speck occurs. Black speck occurs with stackers having substantial slip between the drum and the conveyor belt. This slip provides wear of the drum resulting in substantial amounts of wear particles which will contaminate the products being conveyed. Now having eliminated substantially any slip in the conveyor assembly, no substantial wear will occur and black speck is avoided.

In another embodiment of the conveyor assembly according to the invention the cross section of the widened portion of the drum comprises a portion of a parabolic curve. It is proven that such a curvature of the widened portion provides a substantially constant force within the conveyor belt which is favorable for the life span of the conveyor belt.

In yet another embodiment of the conveyor assembly according to the invention it comprises a support for supporting at least the stacked portion of the conveyor belt.

The conveyor assembly according to the invention can further comprise a conveyor belt having a plurality of links connected by a plurality of rods, wherein at least a number of the links comprise support elements for supporting a stacked portion of the conveyor belt. These links of the conveyor belt are preferably plastic links. Such a conveyor assembly consists out of a minimal number of parts providing a low costs conveyor assembly having a good reliability.

BRIEF DESCRIPTION OF THE DRAWING

These and other features of the invention will be elucidated in conjunction with the accompanying drawing.

DETAILED DESCRIPTION OF THE INVENTION

Figure 1:
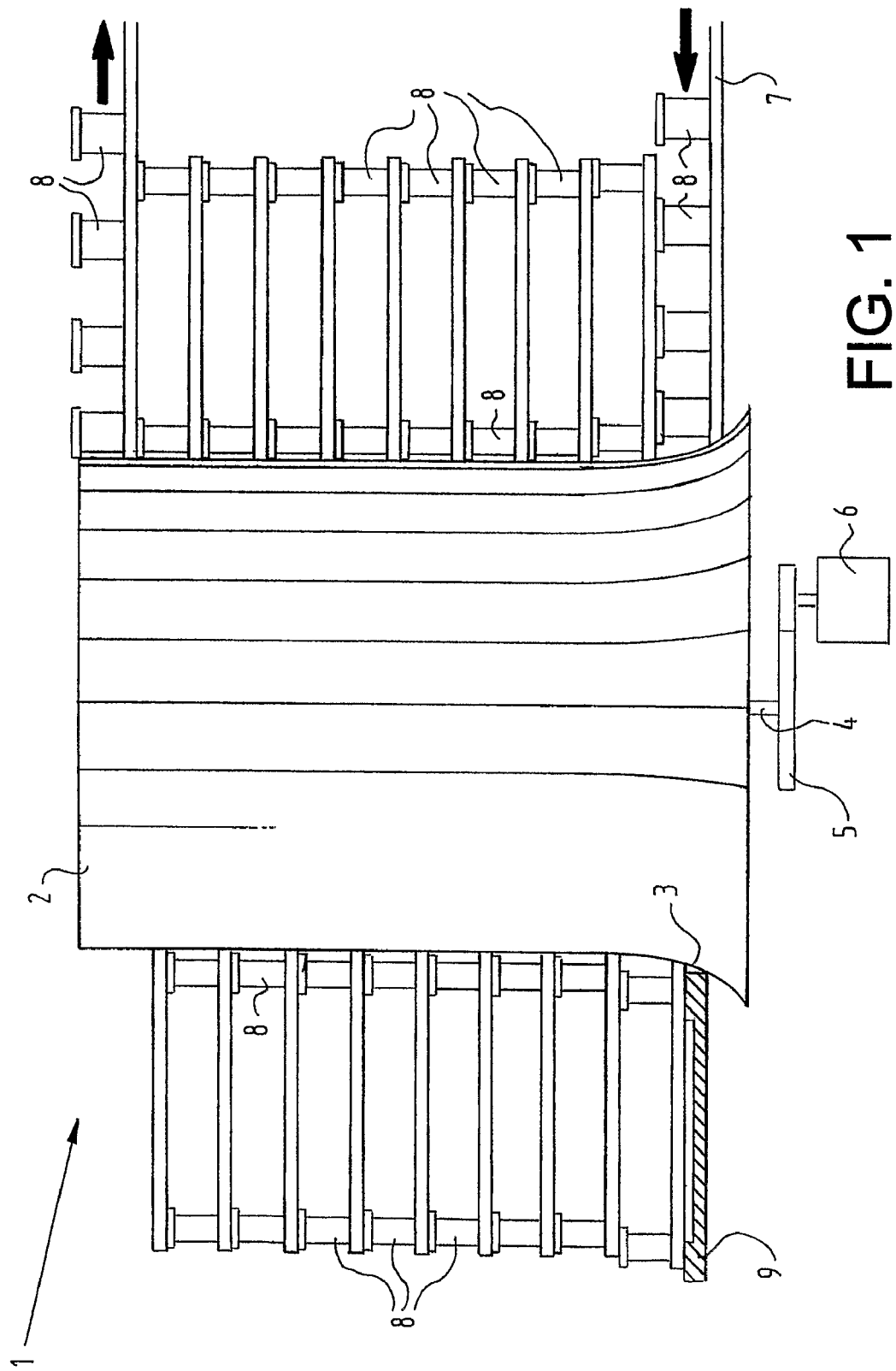

In the drawing a conveyor assembly 1 according to the invention is shown. This conveyor assembly 1 comprises a drum 2 having a widened portion at the bottom. The cross section of this widened portion comprises a parabolic curve 3. At the shaft 4 of the drum 2 a gear wheel 5 is arranged which is driven by a motor 6. The motor 6 is considered to be a means for driving the conveyor assembly.

Rather schematic a conveyor belt 7 is shown, which is introduced at the bottom side of the drum 2 and which leaves the stack at the upper portion of the drum 2. The conveyor belt 7 comprises a number of support elements 8 which enables stacking of the conveyor belt around the drum 2. At the bottom of the stacked conveyor belt 7 a guide 9 is arranged to support the stack.

The peripheral surface of the drum 2 is smooth and the conveyor belt 7 directly abuts the smooth peripheral surface which enables a positive driving of the conveyor belt 7 without any slip on at least the cylindrical portion of the drum 2.

The invention claimed is:

1. A conveyor assembly, such as a stacker, comprising:
   a vertically arranged drum having a substantially smooth peripheral surface; and
   a conveyor belt, at least one full turn wound along the peripheral surface of the drum, said belt comprising support elements to support portions of the belt on top of each other;
   wherein the bottom part of the drum widens outwardly and the remaining part of the drum is cylindrical wherein the cross-section of the widened portion of the drum comprises a portion of a curve.

2. The conveyor assembly according to claim 1, further comprising driving means for driving the assembly, wherein the conveyor belt is directly driven by the drum.

3. The conveyor assembly according to claim 2, wherein the peripheral velocity of at least the cylindrical portion of the drum is substantially equal to the velocity of the belt.

4. The conveyor assembly according to claim 1, further comprising a support for supporting at least the stacked portion of the conveyor belt.

5. The conveyor assembly according to claim 1, wherein the conveyor belt comprises a plurality of links connected by a plurality of rods, and wherein at least a number of the links comprise support elements for supporting a stacked portion of the conveyor belt.

6. The conveyor assembly according to claim 5, wherein the links of the conveyor belt are plastic links.

* * * * *